United States Patent [19]

Steel

[11] Patent Number: 4,601,932
[45] Date of Patent: Jul. 22, 1986

[54] RINGS FOR FLUID DRIVE ASSEMBLIES

[76] Inventor: John B. Steel, 45 Vereker Drive, Sunbury-on-Thames, Middlesex TW16 6HG, United Kingdom

[21] Appl. No.: 338,878

[22] Filed: Jan. 12, 1982

[30] Foreign Application Priority Data

Jan. 20, 1981 [GB] United Kingdom ............... 8101646

[51] Int. Cl.$^4$ .................. B32B 1/08; B32B 5/12; F16L 11/00
[52] U.S. Cl. ...................... 428/36; 428/105; 428/245; 428/288; 428/290; 428/293; 428/295
[58] Field of Search .............. 428/105, 245, 258, 290, 428/288, 223, 36, 293, 294, 295, 910

[56] References Cited

U.S. PATENT DOCUMENTS 4,264,278  4/1981  Weingart ........................ 428/245

Primary Examiner—George F. Lesmes
Attorney, Agent, or Firm—Burns, Doane, Swecker & Mathis

[57] ABSTRACT

In a method of making a ring for a fluid drive assembly, for example a bearing ring for a hydraulic or pneumatic piston or rod, a substrate is formed by two fibrous tapes with fibres arranged in more than one direction, with a tape of unidirectional fibres sandwiched between them. The substrate is passed through a bath of thermosetting resin so that resin is picked up on the substrate. The substrate passes through a die which shapes it and cures the resin, so that the substrate is held by the resin in a desired cross-sectional configuration. Choice of the material of the fibres of the tapes enables desired surface characteristics to be given to the finished material. The substrate is then cut into lengths either by the manufacturer or by the end-user, to form rings. This method enables a material for rings to be produced substantially continuously, and the substrate may be rolled up before it is cut to enable it to be transported and stored easily.

6 Claims, 3 Drawing Figures

RINGS FOR FLUID DRIVE ASSEMBLIES

BACKGROUND OF THE INVENTION

This invention relates to rings for fluid drive assemblies e.g. hydraulic or pneumatic pistons and to methods of making such rings, including methods of making material especially intended for such rings.

DESCRIPTION OF THE PRIOR ART

Bearing rings are known integers which are interposed between a pneumatic or hydraulic piston and its cylinder and which are intended to prevent metal-to-metal contact in the event of sideways movement of the piston. Conventionally, the piston (or rod) also has sealing rings to prevent escape of fluid past it and these may either be completely separate from the bearing ring or form part of an assembly with it.

The present invention relates to the formation of such rings and the present invention will principally be described with reference to bearing rings.

Bearing rings are usually split, so as to allow for ease of assembly onto the piston. They have in the past been formed either of phosphor bronze or white metal but the material itself as well as the fabrication process is very expensive.

PTFE rings have also been used as bearing rings. PTFE is conventionally formed in a slab and material of the appropriate thickness and width is skived off it. The material itself is however expensive and the ring once in position has a tendency to creep under a load.

Bearing rings have also been formed of cotton/pheno material, a cotton sheet being soaked in a thermosetting phenolic resin, formed into a sleeve around a tube, cured and then cut to width, as well as usually being slit to form the split of the ring. This is a multi-stage process and inflexible in the economic sense since it requires formation of a given nubmer of rings of identical diameter.

However, the most common method used at present for the making of bearing rings is the injection moulding of these rings, at least when they are up to approximately 6 inches diameter, using an acetal or nylon thermoplastic resin. The process has its disadvantages notably that it is preferable for tooling reasons to form the rings entire so there is a separate splitting process. Also when the rings are of considerable width but very slight radial thickness there may be difficulty in achieving proper flow of the thermoplastic material all through the mould so as to achieve uniformity. The use of thermoplastics in the material is also slightly undesirable because if the apparatus in which the bearing is housed is abused so that "dieseling" (spontaneous combustion of the vapour of the hydraulic fluid) under pressure occurs, the thermoplastic material may become melted, and some of it adhere to the cylinder wall causing a rough patch which subsequently damages the sealing rings.

But there is a more deep-seated objection to injection moulding these rings which is simply that any change in a measurement of the ring whether in terms of radial thickness, width or diameter requires an entirely separate mould, and tooling costs are extremely high.

SUMMARY OF THE INVENTION

In the present invention we are aiming to provide a material for sealing or bearing rings which is produced substantially continuously to indefinite lengths with high control both of width and thickness and which are preparable to any diameter within a wide range of diameters.

The method of preparation which is being used is as follows: and is based on a commercially available method known as "Pultrusion". In this process as it is known so far, a unidirectional fibrous substrate such as a glass or carbon or other fibre or wire is pulled through a bath of thermoset resin and then through a shaping and curing die in which the resin picked up by the substrate is both formed to a desired configuration and cured. This progression of the substrate is caused by pulling the cured and formed material from beyond the die. Conventionally walking (straight-line) gripper pullers have been used. Machines for this process are commercially available (and in particular a suitable machine is available from Pultres Limited, Stevenson Road, Clacton-on-Sea, Essex, England). The conventional products of this process are precisely profiled, often follow a channel or hollow section, are extremely rigid yet lightweight and are used where rigidity and longitudinal strength are of the essence.

To produce a material suitable for rings and ultimately in order to produce bearing rings we modify this process (and may modify the machine) by providing as the substrate or surface layers which is drawn through the bath and on which resin is cured, a tape in which the fibres are not all unidirectionally aligned, so that it has some strength against lateral separation. Any suitable material or synthetic material or combination of materials may be used, and woven or knitted tapes of for example terylene linen or cotton are particularly preferred. The width of this tape will be substantially the width of the finished bearing or sealing ring. When the ring is a bearing ring, the resin used will cure hard.

Although a thin ring would be formed by passing only a single tape through the Pultrusion process we usually prefer to use at least two such tapes face-to-face and furthermore to sandwich between them a layer of unidirectional fibres such as glass fibres. In all cases the product is a tape-like article (with square triangular or other cross-section) of an indefinite length which, most importantly, is flexible so that it can be rolled up. We prefer to take the product of the machine and roll it either helically or spirally onto a former of a diameter which is appropriate having in mind the eventual end use of the tape (in terms of the diameter of piston or housing into which bearing rings made from it are going to fit). While mounted in these spirals or coils the formed material is subjected to inherent set or a post-cure treatment so that it adopts a set which is approximately correct for its intended use. It may be cut to individual lengths at the machine. However, the intended manner of use of the present tape is that it should be held by the end user in coil or roll form so that he, when he wishes to replace a bearing ring, merely has to cut off an appropriate length of the tape and place it around the piston, where it will adopt a more precisely correct curvature.

The formation of bearing rings can either take place in the manufacturer's factory or on site with the user. We may modify the Pultrusion machine by doing away with the working linear grippers and instead pulling the substrate through the machine by rolling the formed products onto a driven rotating cylinder or mandrel of appropriate diameter, as discussed above, or through a series of rollers, heated or cooled.

We can, as stated, provide by this process material for forming a ring for a hydraulic or pneumatic piston or rod which is of precisely controlled and constant width and thickness. We can control also its resilience/hardness and flexibility by adjustment of the number, type and relative amount of layers of the substrate included within it. Furthermore, we can achieve considerable control over the surface characteristics of the material and can achieve characteristics at one surface different from those at another. This we may do by providing in the tape or one of the tapes surface-affecting material. For example one of the tapes may have warp threads or strips of PTFE so that the surface at which that tape is positioned will at least to some extent have the bearing and friction properties of PTFE. Similarly, the tape or a tape could be impregnated with a lubricant such as molybdenum sulphide which will be carried by the resin through which the tape is passed to the surface of the finished material. Even carbon fibres or electrically conductive wire could be incorporated into the warp of the tape.

Lastly, it should be pointed out that the material at least when there is a plurality of layers of substrate allows the use in such rings of high-strength material like glass-fibre which because it is highly abrasive would not be permitted at the surface of the ring. The presence of such an abrasive material is possible because it is separated from the surface of the material by at least one layer of the non-abrasive tape.

DESCRIPTION OF THE DRAWINGS

A particular process for making a material for a bearing ring, and an example of such material will now be described with reference to the accompanying drawings wherein.

DESCRIPTION OF THE PREFERRED EMBODIMENTS

Figure 1:
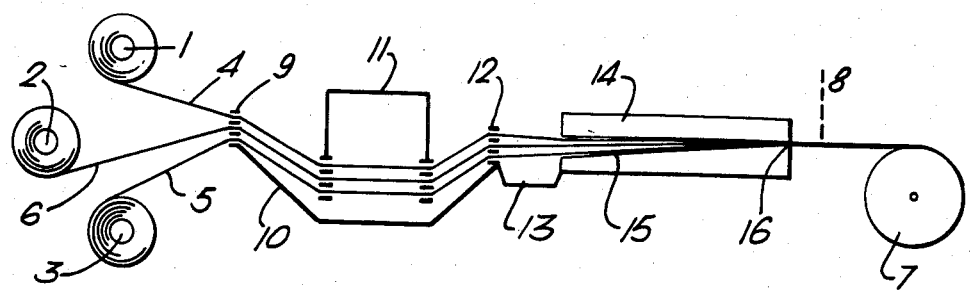
FIG. 1 is a highly diagrammatic layout of a Pultrusion machine adapted for the process.

FIG. 1 of the drawings shows highly schematically a modified Pultrusion machine. This is for making a bearing ring material having a tape at each face and with at least one layer of unidirectional material sandwiched between the tapes. There are three supply reels 1, 2 and 3, an upper facing tape 4 being fed from reel 1, a lower facing tape 5 from reel 3 and a web or mat 6 of unidirectional material such as glass-fibre being fed from reel 2. These are pulled through the machine by a rotating mandrel 7 of which the diameter is approximately correct for the intended end-use diameter of rings formed from the material. Alternatively, the working linear gripper pullers which are conventional in such machines can be used at a position indicated by dotted line 8 with the produced material then being rolled up onto mandrels such as 7.

The materials are pulled from their reels 1, 2 and 3 through a guide comb 9 and forced into a bath 10 of thermosetting resin material such as an epoxy resin. Other suitable resins are for example silicone, polyester, polyimide or vinyl ester systems. They are held in the bath below the level of the liquid resin by a double comb which is adjustable as to its height and which holds the materials 4, 5 and 6 separate within the bath so that each is completely surrounded by the resin material. They are then passed through a further comb 12 and then over a drip tray 13 and into an electrically heated die 14. As can be seen, the entry orifice 15 of this die is larger than its exit orifice 16, with its internal passage tapering between the two, the desired form of the material being imposed primarily by the exit orifice. The die is electrically heated and at such a temperature, combined with the rate of feed of the material, that curing of the resin is very nearly complete by the time that the material leaves the exit orifice—say 95% cured. The material on the mandrel 7 is then post-cured at a moderate temperature so that it adopts a set which is approximately appropriate to its intended diameter in final use.

Figure 2:
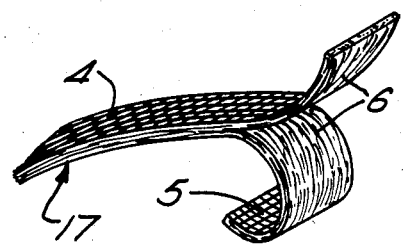
FIG. 2 is a view of one embodiment of the material formed.

The final material, given the general reference 17, is seen in FIG. 2 where one end has however been split open to show the structure. It is quite easy to part this material in the plane of the unidirectional reinforcement layer 6 when such is provided. The upper facing tape 4 can be seen on one face the lower tape 5 on the other. The natural thickness of the materials 4, 5, 6 is adjusted to the width of the orifice 16 such that tape structure of the tapes 4 and 5 is visible at the surfaces of the finished article which is a substantially flexible yet hard surfaced and incompressible material. It can be seen that the surface properties of the material could be affected by the inclusion in one or both of the tapes as desired of the materials appropriate for that purpose—for example insertion of PTFE threads or strips or of lubricant or metal. The tape(s) may be of a size and be disposed so as also to extend over the side or other minor surfaces of the tape.

Figure 3:
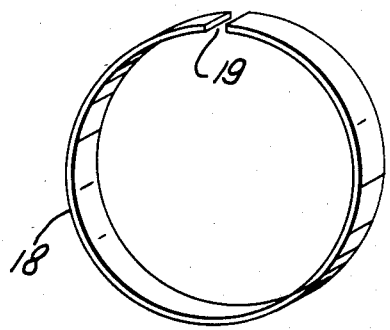
FIG. 3 shows a length of such material forming a split bearing ring.

It is primarily intended that the material will be stored by the user in roll or spiral form and then cut to length as seen for example in FIG. 3 where a bearing ring 18 is seen formed of the material 17, with a butt or scarfe joint 19. If it is desired to form an endless bearing ring then when the material is as seen in FIG. 2 it is a simple matter to split the two ends as shown, cut off respectively opposite facing layers and clamp together the two half thickness ends thus formed with a suitable adhesive. Alternatively, they may be riveted together or (especially in the manufacturer's factory) secured by injection moulding around them.

If a resin is used in the bath which is elastomeric when cured, then the ring material produced may be suitable for making sealing rings.

By suitable shaping of the die, rings of cross-sections other than a simple rectangle may be produced. For example, the material may have a flange at one end of or in the middle of its cross-sectional length, or may be of trapezoidal or triangular cross-section.

It may be seen that rings of a range of diameters can be formed from a length of material either in the factory or by the end user. This coupled with cheapness and high accuracy particularly the thickness tolerance offered gives very substantial advantages.

What I claim is:

1. Elongate material for forming a ring for a fluid drive assembly, the material comprising:
    a substrate in a cured matrix of thermosetting resin shaped to a predetermined cross-sectional configuration corresponding to the cross-sectional configuration of the ring, said substrate including fibres aligned in more than one direction;
    the substrate comprising:

a first substrate material formed from a tape with fibres aligned in more than one direction, a second substrate material formed from a tape with fibres aligned in more than one direction, a third substrate material formed from a fibrous bundle, the fibres of said fibrous bundle being aligned unidirectionally in the direction of elongation of the material, said third substrate material being sandwiched between said first substrate material and the second substrate material; and the material being flexible about axes perpendicular to its axis of elongation.

2. Material according to claim 1, wherein a surface property of the material is derived from at least one of the first and second substrate materials.

3. Elongate material of constant, solid cross-section for forming a ring for a fluid drive assembly, the material comprising:

a substrate in a cured matrix of thermosetting resin having a predetermined constant solid cross-section corresponding to the cross-section of the ring, the substrate including continuous fibres lying in the direction of elongation, and fibres aligned in another direction;

the substrate comprising:

a first substrate material formed from a tape with fibres aligned in more than one direction, a second substrate material formed from a tape with fibers aligned in more than one direction, a third substrate material formed from a fibrous bundle, the fibers of the bundle being aligned unidirectionally in the direction of elongation and sandwiched between said first and second substrate materials; and the material being flexible about an axis perpendicular to the direction of elongation.

4. Material according to claim 3, wherein a surface property of the material is derived from at least one of said first and second substrate materials.

5. A ring for a fluid drive assembly formed from a length of elongate material, the length being approximately equal to the circumference of the ring, the material comprising:

a first substrate material adjacent one surface of the material and having continuous fibers in the direction of elongation and fibers lying in another direction;

a second substrate material adjacent an opposite surface of the material and having continuous fibers in the direction of elongation and fibers lying in a different direction;

a third substrate material sandwiched between said first and second layers comprising unidirectional fibers lying in the direction of elongation; and the first, second and third substrate materials being in a matrix of cured thermosetting resin having a cross section corresponding to a cross section of the ring.

6. The ring of claim 5, wherein a surface property of the ring is derived from at least one of said first and second substrate materials.

* * * * *